(12) United States Patent
Wexler

(10) Patent No.: US 6,382,140 B2
(45) Date of Patent: May 7, 2002

(54) APPARATUS AND METHOD FOR ENCAPSULATING AN ANIMAL'S HEAD

(76) Inventor: Toby Wexler, 303 Paddington Dr., Lafayette, LA (US) 70508

( * ) Notice: Subject to any disclaimer, the term of this patent is extended or adjusted under 35 U.S.C. 154(b) by 0 days.

(21) Appl. No.: 09/796,903

(22) Filed: Feb. 28, 2001

Related U.S. Application Data

(63) Continuation-in-part of application No. 09/557,259, filed on Apr. 24, 2000, now Pat. No. 6,227,148, which is a continuation-in-part of application No. 09/433,527, filed on Nov. 3, 1999, now Pat. No. 6,082,309.

(51) Int. Cl.⁷ .............................................. A01K 27/00
(52) U.S. Cl. ...................................................... 119/837
(58) Field of Search ................................ 119/815, 821, 119/837; 128/857, 858

(56) References Cited

U.S. PATENT DOCUMENTS

| | | | | |
|---|---|---|---|---|
| 1,395,116 A | * | 10/1921 | Johnson | 119/837 |
| 3,173,401 A | * | 3/1965 | Lupo, Sr. | 119/837 |
| 4,160,428 A | * | 7/1979 | Wilkinson | 119/837 |
| 4,252,086 A | | 2/1981 | Schenck | |
| 5,136,984 A | | 8/1992 | Askinasi | |
| 5,299,531 A | * | 4/1994 | Dietz | 119/837 |

* cited by examiner

Primary Examiner—Thomas Price
(74) Attorney, Agent, or Firm—Robert N. Montgomery

(57) ABSTRACT

An animal muzzling apparatus, generally for temporary use during treatment and grooming of an animal, to prevent injury to attending personnel due to bites, the muzzle being transformable into a gas mask. The apparatus being generally a transparent globular shape in a standoff relationship with and fully enclosing an animal's head, the enclosure having sufficient air breathing holes or slots therein and a visor type closure meansfor allowing the globe to be quickly and easily extended over the head of the animal and secured thereabouts with hook and loop fastening means. The globe may optionally be fitted with a removable front cover. The cover may be fitted with an adapter membrane to seal the globe and adapted to receive a gas hose connection.

16 Claims, 4 Drawing Sheets

APPARATUS AND METHOD FOR ENCAPSULATING AN ANIMAL'S HEAD

This is a continuation-in-part of U.S. application Ser. No. 09/557,259 filed Apr. 24, 2000 now U.S. Pat. No. 6,227,148 which was a continuation -in-part of application Ser. No. 09/433,527 filed on Nov. 3, 1999 now issued as U.S. Pat. No. 6,082,309. Applicant hereby claims priority under 35 USC 120 to the parent application. This invention is an improved version of our previous apparatus relating generally to animal muzzles and head restraints and more particularly to the muzzling and encapsulation of the head of biting animals, in particular canines and felines, in a manner that prevents injury to treatment personnel and animal alike and includes adaptation for administering gas and use as a cupped collar.

SPECIFICATION

BACKGROUND OF THE INVENTION

1. Field of the Invention
2. General Background

As is generally known, many animals kept as pets, especially cats, are widely known to be quite fierce when being restrained. Such animals are required by law to undergo veterinary checkups for immunization against various diseases, as well as the fact that a pet owner generally brings these animals to veterinarians for routine treatment. It is known that animals, such as dogs and cats, become extremely nervous and agitated in the presence of unknown surroundings and strange smells. Accordingly, the animal may attack or strike the veterinarian, the owner, or various other staff members, thereby causing injury and, thus, subjecting the practitioner to liability. In order to prevent such injuries, many veterinarians employ conventional muzzles that are well known and accepted within the prior art. It has been determined that a pet owner becomes extremely concerned in regard to the safety of their animal when such muzzles are employed in their presence since extreme force is often used in their application. Many muzzles existing in the prior art are relatively complicated, unattractive devices and create a great feeling of apprehension in regard to the pet owner when employed to restrain the pet. Examples of such typical muzzles may be obtained by reference to U.S. Pat. No. 4,252,086, 5,136,984 and 5,299,531. Essentially, the prior art muzzles consist of a sleeve of some type and a plurality of straps and restraining members that are placed about the snout of the animal and secured about the head of the animal by means of a plurality of fastening devices. As indicated, many pet owners seriously object to the use of such muzzles and, hence, make it difficult for the veterinarian to optimally and adequately administer to the physical needs of the animal without sustaining injury. Since pet owners often assist in controlling the animal while being examined by the veterinarian, the application of such devices often causes the animal to inflict injury to the pet owner, thus increasing veterinarian liability.

As acknowledged by the prior art patents, there are few known muzzles that are available in the marketplace to restrain or to muzzle a cat. The necessity of doing so is apparent as cats have extremely sharp teeth capable of inflicting severe injuries. Many prior art muzzles severely restrict the breathing capability of animals as a result of the muzzle rotating relative to the animal's head. This is an extreme disadvantage in a veterinary examination since the animal, due to anxiety and so on, breathes more rapidly due to restriction by the muzzle. Therefore, it stands to reason that a muzzle should allow the animal to breathe as optimally as possible and be applied rapidly and easily without undue stress.

According to Schenek in U.S. Pat. No. 4,252,086, it is further desirable for the muzzle to be capable of covering the eyes of the animal as well as its mouth, especially in the case of felines, to produce a calming effect on the animal. However, in fact, such devices have been found to further traumatize the animal and are extremely difficult to administer, severely restrict breathing, and prevent visual inspection of the animal's eyes and head during the examination.

Other devices are used for animal body restraints and specifically designed for cats, such as is disclosed by Salvatore in U.S. Pat. No. 5,020,478. However, such devices, while confining the animal generally, only provide access to the animal's head. Other devices, which utilize a wire cage arrangement to fully contain the body, fail to allow access to the animal's front feet without exposure to its sharp teeth.

It is, therefore, an object of the present invention to provide an improved muzzle or head restraint that allows for fast and easy application, better breathing and head control while allowing visual head examination. The device thereby avoids the many disadvantages associated with prior art muzzles.

In addition, the muzzle may be converted to a gas treatment mask whereby the animal may be anesthetized, euthananized, given oxygen, or other such gas treatment.

Another object of the invention is to provide a head encapsulation that is both lightweight and easy to install on the animal's head without trauma and have maximum size accommodation.

SUMMARY OF THE INVENTION

The instant invention is a muzzle or head encapsulation apparatus for animals undergoing veterinary treatment in the form of a transparent globe for providing standoff encasement of the animal's head. The globe or encasement includes sufficient air breathing slots therein and a slotted, elastic membrane for allowing the globe to be quickly and easily extended over the head of the animal. The globe is further fitted with a flexible sleeve encircling the slotted, elastic membrane, extending around the animal's neck and secured thereabouts with a quick drawstring-type, gathering collar having a quick locking apparatus for securing the drawstring to prevent removal. The drawstring collar may also be used to help restrain the animal. The globe may optionally be fitted with a removable front cover for allowing access to the animal's head for administering medication and treatment to the animal's head. The globe further allows the animal's head to be positioned readily relative to the body. The animal is fully aware of its surroundings and thus not traumatized any more than necessary. The apparatus is applied very rapidly by simply placing the container over the animal's head and drawing the drawstring, thus leaving the animal very little time to react. Although the head globe may be left on the animal for some period of time without attendance, it is generally used during treatment while the animal is otherwise being restrained. In such cases, the globe or standoff head covering may be utilized to administer gas treatment as well.

BRIEF DESCRIPTION OF THE DRAWINGS

For a further understanding of the nature and objects of the present invention, reference should be made to the FIG. 1 is a rear isometric view of the preferred embodiment.

DETAILED DESCRIPTION OF THE PREFERRED EMBODIMENT

Figure 1:
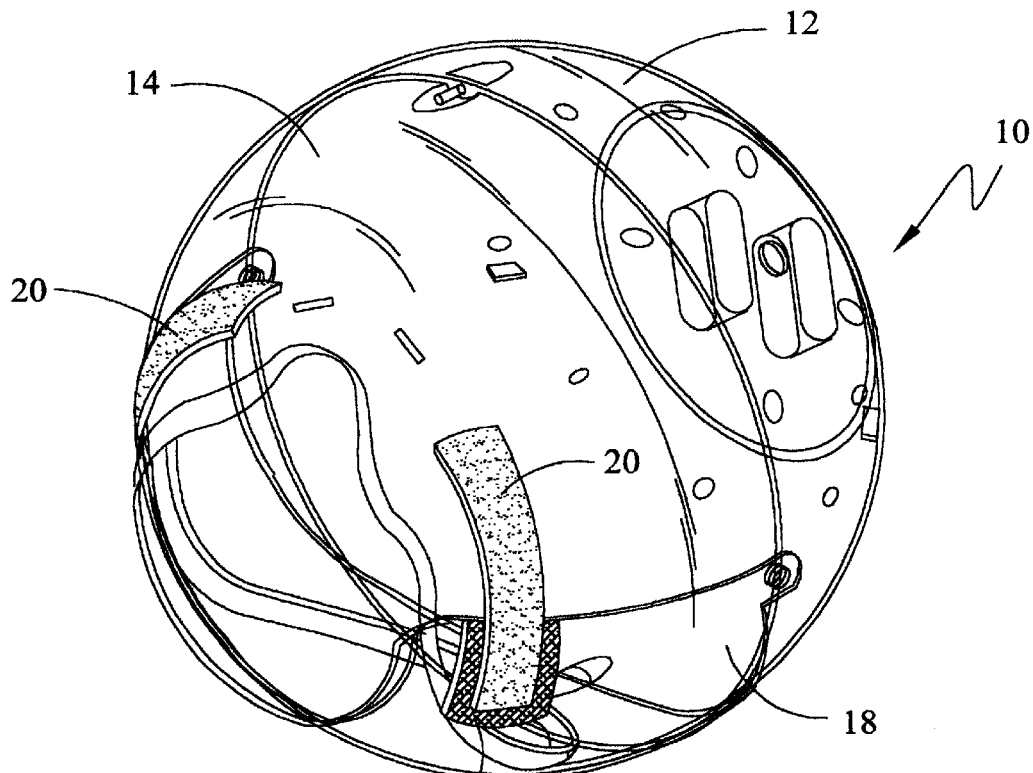
Figure 2:
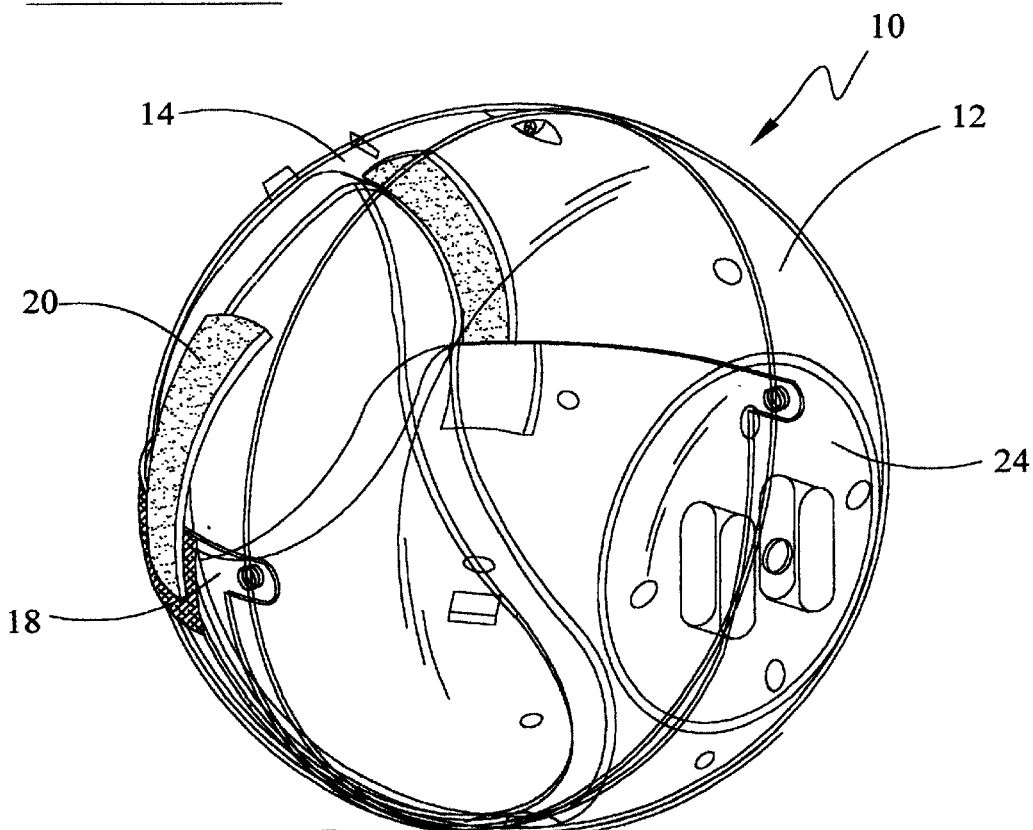
FIG. 2 is a front isometric view of the preferred embodiment.

As illustrated in FIG. 1, the animal head covering serving as a muzzle is a spherical shaped globe assembly 10. The globe assembly 10, as seen from the rear, includes an upper or front hemispherical portion 12 and a rear or lower hemispherical portion 14. The globe assembly 10 is generally made of a lightweight, transparent or semitransparent, polymeric material. The globe may be sized to accommodate the average cat's head. However, various models may be provided to accommodate larger wild felines, dogs, and smaller animals, such as kittens and small mammals. The globe assembly 10 may also be lightly tinted to provide a more calming effect on the animal. Upper and lower hemispheres 12,14 are removably fastened one to the other at a diametrical parting line 16 along the globe's equator. A hinged visor member 18 is effectively captured and pivotal at the connection of the two hemispheres 12,14 along the parting line 16. A hook and latch fastening is provided for securing the visor member 18 to the lower hemispherical portion 14, composed of a strap portion 20 and a pad portion 22. As seen in FIG. 2, the upper hemispherical portion 12 is fitted with a removable faceplate member 24.

Figure 3:
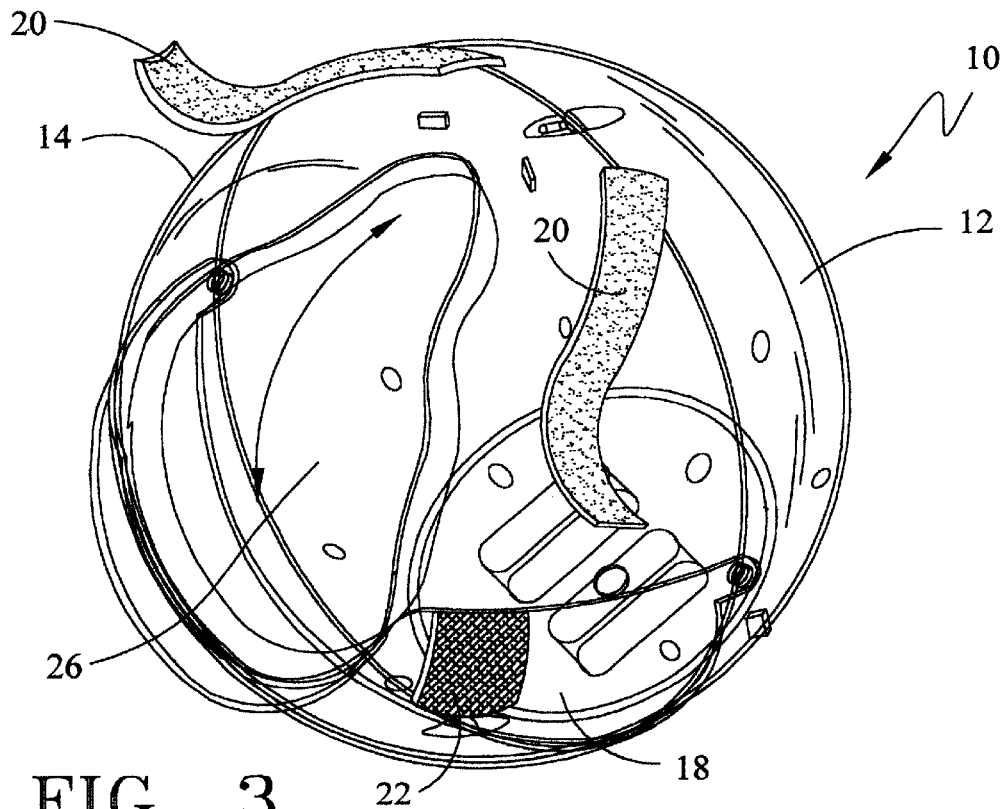
FIG. 3 is a rear isometric view of the preferred embodiment with visor fully open.

Looking now at the lower hemispherical portion 14 of the globe assembly 10 as seen in FIG. 3, the visor member 18 may be fully opened, exposing a relatively large pear-shaped opening 26 that will accommodate a relatively wide range of animal neck sizes and allow for easy insertion of an animal's head into the globe 10 without restriction.

Figure 4:
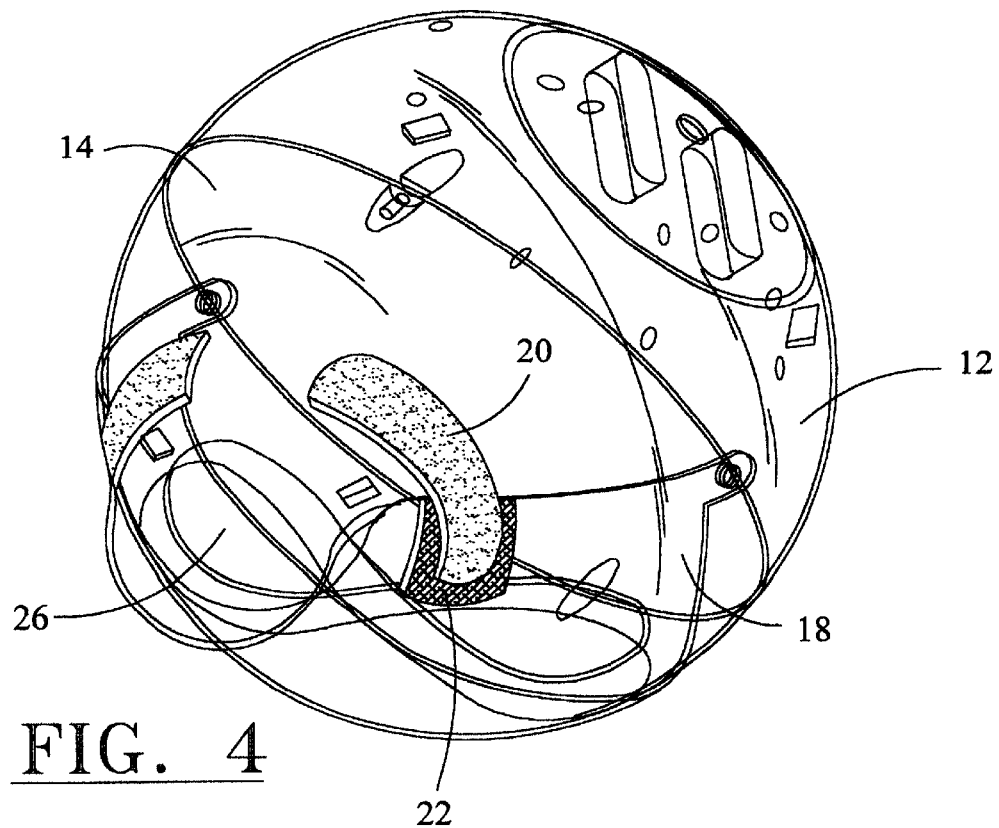
FIG. 4 is an isometric view of the preferred embodiment with visor fully closed.

By rotating the visor 18 to the fully closed position as seen in FIG. 4, the aperture opening 26 becomes smaller to accommodate animals with small necks. Once an animal's head is captured between the visor member and the lower hemispherical member 14, the visor is secured in place by hook and loop fasteners 20,22 for fast locking.

Figure 5:
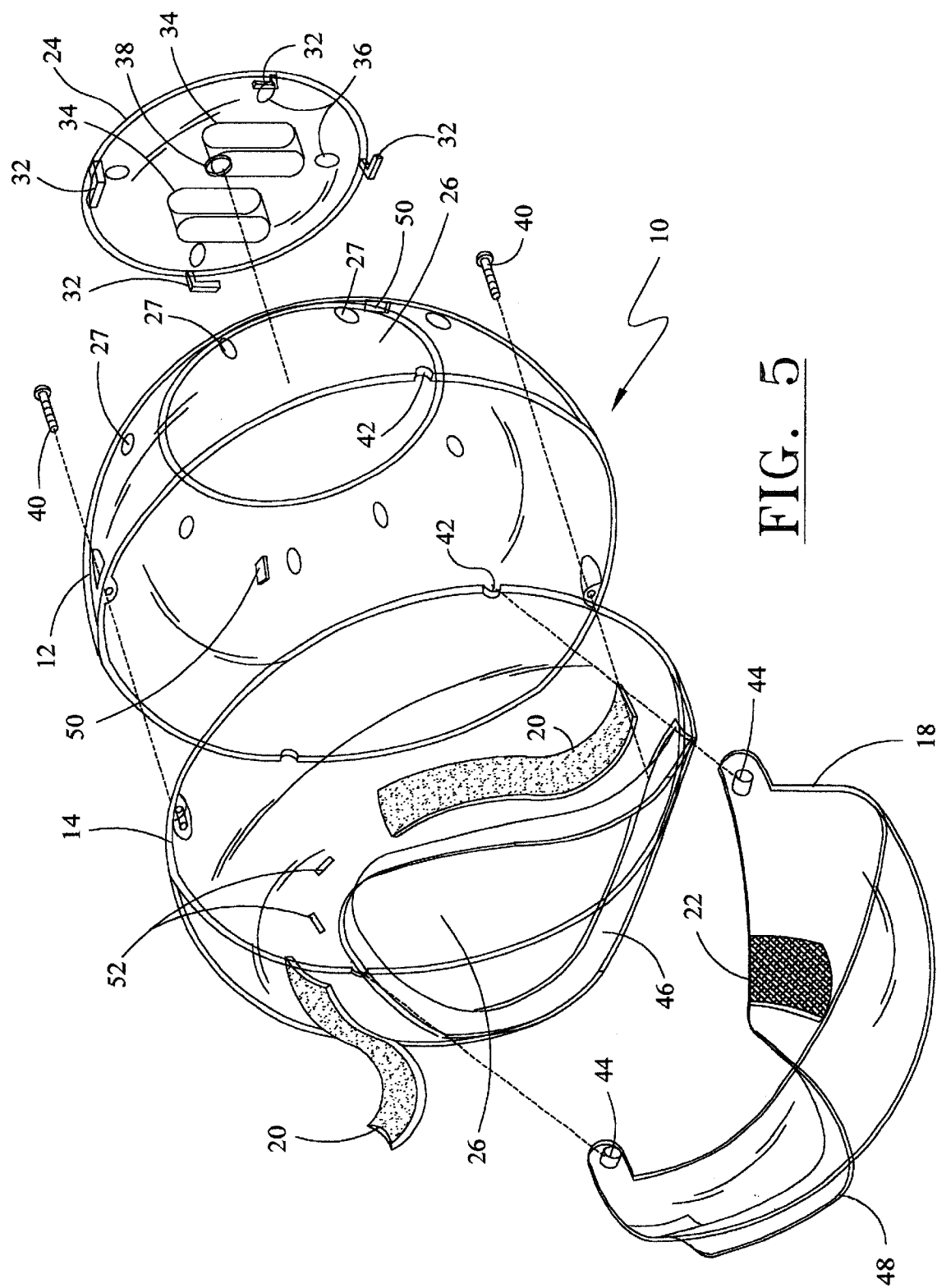
FIG. 5 is an exploded isometric view of the preferred embodiment.

As better seen in FIG. 5, the globe assembly 10 is composed of the upper hemispherical member 12 which includes a plurality of breathing holes or slots 27 located peripherally around a larger opening. A faceplate 24 having notched cleats 32 and finger notches 34 molded therein is provided for removably closing the larger opening 28 in the upper hemispherical member 12. Additional air holes 36 also are provided in the faceplate 24. A central opening 38 is further provided to accommodate a hose fitting (not shown) for adaptation to a gas administering apparatus. The gas fitting may also include a covering for sealing air holes 36 and 27. This faceplate 24 is a twist lock type cover which, when removed, allows access to the animal's head. The cover may also be removed to allow cleaning and greater ventilation if the animal is subjected to long periods of treatment or is recovering from surgery, thus allowing trachea tubes, medications, etc., to be employed. In any case the globe still prevents the animal from harming itself and others.

Fasteners 40 are provided at strategic molded points along the globe's equator, each hemispherical member having recessed holes or internal threads for securing the upper hemispherical member 12 to the lower hemispherical member 14. It is anticipated that the two hemispheres may be connected by a variety of methods well known within the art. Notches 42 in each of the hemispheres are provided on opposite sides of globe along the equator to accommodate and capture the pivot pins 44, located on the visor member 18, at assembly. The visor 18 is rotatable in close proximity with the globe assembly 10.

A lip or flange 46 is provided facing inwardly around the periphery of the pear-shaped opening 26 in the lower hemispherical member 14 and serves as a means to roll or dull the sharp raw edge of the opening 26. Likewise, a lip or flange facing outwardly is provided peripherally along the leading edge of the visor member 18.

Stop blocks 50 and 52 are provided on the outer surface of the globe hemispherical members 12,14 to limit the pivotal travel of the visor member 18 relative to the globe. Indentations may be provided in the polymeric material in the molding process to insure proper placement of the fastening members 20, 22.

Figure 6:
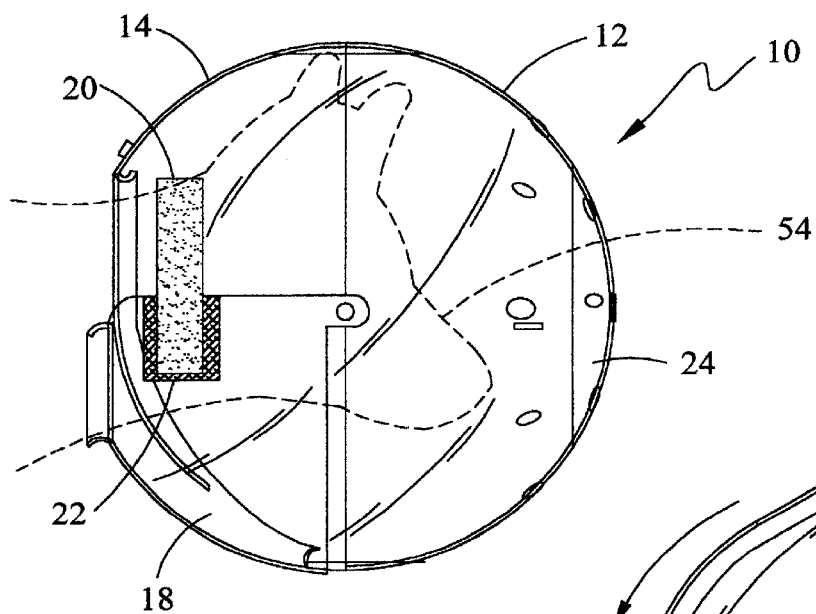
FIG. 6 is a side elevation view of the preferred embodiment as used with dogs.
Figure 7:
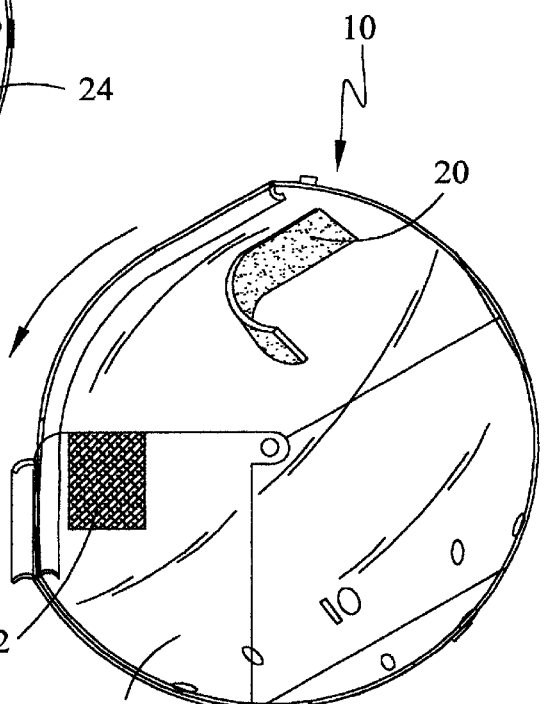
FIG. 7 is a side elevation view of the preferred embodiment in the fully open position.
Figure 8:
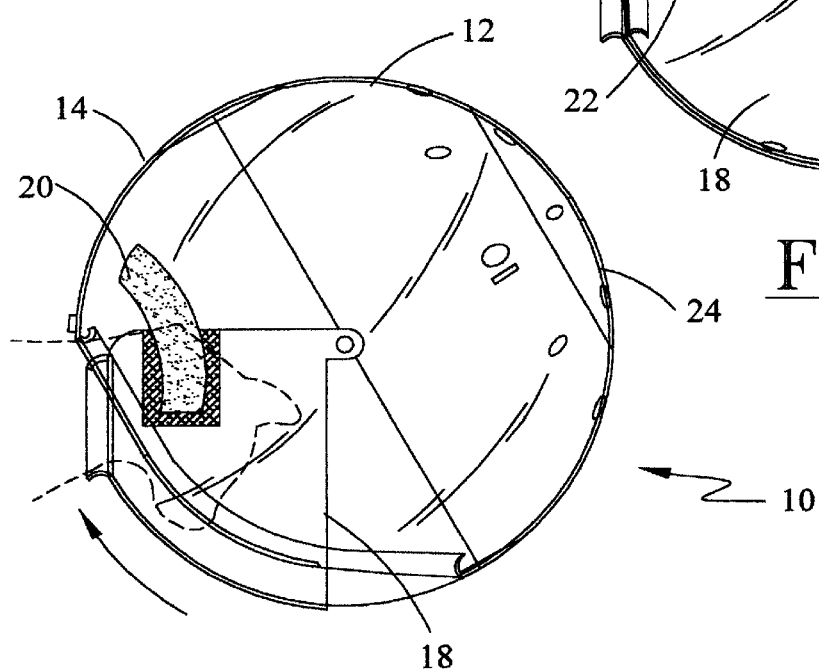
FIG. 8 is a side elevation view of the preferred embodiment as used with small cats.

In use, the globe 10 is opened to the fully open position, as seen in FIG. 7, placed over an animal head 54 and secured around its neck, as seen in FIG. 6. The visor member is pivoted forward and held in this position by user's left hand while the right hand rotates the globe 10 relative to the visor 18, thereby capturing the animal's head 54, as seen in FIG. 6. The visor member 18 is then secured in position with straps 20 in contact with pads 22. The procedure may be reversed for smaller animals by rotating the visor 18 instead of the globe 10, as seen in FIG. 8.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in any limiting sense.

What is claimed is:

1. An animal head covering for use in veterinary examination of small animals comprising:
    a) a globular enclosure having upper and lower hemispherical members, each said hemispherical member having an aperture therein;
    b) a visor member pivotally attached to said globular enclosure in a manner whereby said visor covers at least a portion of said aperture in one of said hemispherical members; and
    c) a means for adjustably securing said visor in position relative to said hemispherical members.

2. The head covering according to claim 1 wherein said upper and lower hemispherical members are removably fastened one to the other at the equator of each hemisphere, each said hemispherical member having notches located at said equator for capturing the pivoting means of said visor.

3. The head covering according to claim 1 wherein said aperture in said upper hemispherical member further comprises a plurality of air holes surrounding said aperture and a removable twist-lock faceplate adapted to said aperture, said face-plate having finger notches and a plurality of air holes located peripherally around a central gas fitting hole.

4. The head covering according to claim 1 wherein said aperture located in the lower hemispherical member is pear-shaped, having an edge rolled inwardly.

5. The head covering according to claim 1 wherein said visor member comprises an arcuate shape generally conforming to said upper and lower hemispherical members and having pivotal pins attachable to said globular enclosure at the juncture of said upper and lower hemispheres, one edge of said visor being rolled outwardly.

6. The head covering according to claim 1 wherein said means for adjustably securing said visor in position relative to said hemispherical members is a hook and latch fastening.

7. The head covering according to claim 1 wherein said upper and lower hemispherical members further comprise strategically located raised portions which serve as stops for said visor member.

8. The head covering according to claim 1 wherein said opening in said upper hemispherical member further comprises a plurality of air holes surrounding said relatively large aperture and a removable twist-lock faceplate adapted to lock into said aperture, said face plate having finger notches and a plurality of air holes located peripherally around a central gas fitting formed integral with said face plate.

9. The head covering according to claim 1 wherein said opening in lower hemispherical member is pear-shaped, having an edge rolled inwardly.

10. The head covering according to claim 1 wherein said visor member comprises an arcuate shape generally conforming to said upper and lower hemispherical members having pivotal pins attachable to said globular enclosure at the juncture of said upper and lower hemispheres, one edge of said visor being rolled outwardly.

11. The head covering according to claim 1 wherein said means for adjustably securing said visor in position relative to said hemispherical members is a hook and latch fastening.

12. The head covering according to claim 1 wherein said upper and lower hemispherical members further comprise strategically located raised portions, which serve as stops for said visor member.

13. A head covering for use in veterinary examination of small animals comprising:
   a) a globular enclosure having an upper and a lower hemispherical member, said hemispherical members being removably fastened one to the other at the equator of each hemisphere, each of said hemispherical members having a relatively large aperture which includes the polar region of each said hemisphere;
   b) a visor member pivotally attached to said globular enclosure in a manner whereby said visor covers at least a portion of said aperture in one of said hemispherical members; and
   c) a means for adjustably securing said visor in position relative to said hemispherical members.

14. A method of encapsulating the head of an animal for treatment and observation during routine examination by veterinary personnel comprising the steps of:
   a) restraining said animal with the exception of the head;
   b) inserting the head of said animal into an apparatus comprising:
      i) a globular enclosure having an upper and a lower hemispherical member, each said hemispherical member having an aperture therein;
      ii) a visor member pivotally attached to said globular enclosure in a manner whereby said visor covers at least a portion of said opening in one of said hemispherical members; and
      iii) a means for adjustably securing said visor in position relative to said hemispherical members;
   c) adjusting size of said aperture in said lower hemispherical member by pivotally positioning said visor member in a manner whereby said visor and said lower hemispherical member captures the head of said animal;
   d) securing said visor in position; thereby preventing withdrawal of the head of said animal.

15. The method according to claim 12 further comprising the step of safely examining the head of the animal by removing a faceplate portion from said upper hemispherical member.

16. The method according to claim 12 further comprising the step of attaching a gas attachment having means for sealing said globular enclosure and administering a gas.

* * * * *